United States Patent
Gonzalez Gallegos

(10) Patent No.: US 7,493,834 B2
(45) Date of Patent: Feb. 24, 2009

(54) LOAD CELL FOR ELEVATORS AND SIMILAR

(75) Inventor: Rafael Gonzalez Gallegos, Rivas Vaciamadrid (ES)

(73) Assignee: Dinacell Electronica S.L., Rivas Vacia Madrid (ES)

(*) Notice: Subject to any disclaimer, the term of this patent is extended or adjusted under 35 U.S.C. 154(b) by 154 days.

(21) Appl. No.: 11/713,162

(22) Filed: Mar. 1, 2007

(65) Prior Publication Data

US 2007/0151773 A1 Jul. 5, 2007

Related U.S. Application Data

(63) Continuation-in-part of application No. PCT/ES2004/000515, filed on Nov. 18, 2004.

(30) Foreign Application Priority Data

Sep. 2, 2004 (ES) .............................. 200402125

(51) Int. Cl.
G01L 1/22 (2006.01)
B66B 1/34 (2006.01)

(52) U.S. Cl. .................... 73/862.391; 73/862.471; 73/862.474; 177/211; 177/238; 187/393

(58) Field of Classification Search ............ 73/862.391, 73/862.41–862.474; 177/211, 238; 187/393
See application file for complete search history.

(56) References Cited

U.S. PATENT DOCUMENTS 2,795,136 A * 6/1957 Matt ...................... 73/862.474
3,376,740 A * 4/1968 Harvey ................... 73/862.474
3,426,589 A * 2/1969 Brendel .................. 73/862.471
3,618,378 A * 11/1971 Shull et al. .............. 73/862.474
3,868,662 A * 2/1975 Russell, Jr. ............. 73/862.471
4,118,978 A 10/1978 Lowenheck
6,122,978 A 9/2000 Callendrier
6,123,176 A * 9/2000 O'Donnell et al. .......... 187/393
6,205,868 B1 * 3/2001 Miller ................... 73/862.391
6,209,401 B1 4/2001 Backlund
6,450,534 B1 * 9/2002 Blakesley et al. ........ 280/801.1
7,066,036 B2 * 6/2006 Ochovo ................. 73/862.472
7,237,656 B2 * 7/2007 Barrett et al. ............... 187/412
7,242,286 B2 * 7/2007 Knox ....................... 340/457.1
7,424,832 B1 * 9/2008 Nunnelee ............... 73/862.472

FOREIGN PATENT DOCUMENTS

ES 2187298 5/2003

* cited by examiner

Primary Examiner—Randy W Gibson
(74) Attorney, Agent, or Firm—Horst M. Kasper

(57) ABSTRACT

The Invention relates to a load cell which is designed to be coupled a flat belt-or similar-type elements for lifting elevators or similar. The inventive cell comprises a cell body (1) and a casing (2) which can be coupled to one another. According to the Invention the solid, metallic cell body support the corresponding strain gage. In addition, three cylindrical pivots (5) project out from the body, said pivots comprising a smooth outer surface and having a length that is adapted to the width of the lifting belt (9). One of the smaller lateral faces (6a) of the essentially prism shaped casing is open such that it can be coupled to the cell body. Furthermore, the upper and lower faces of the casing are provided with opposing openings for the passage of the lifting belt during the operational mounting of the cell.

9 Claims, 2 Drawing Sheets

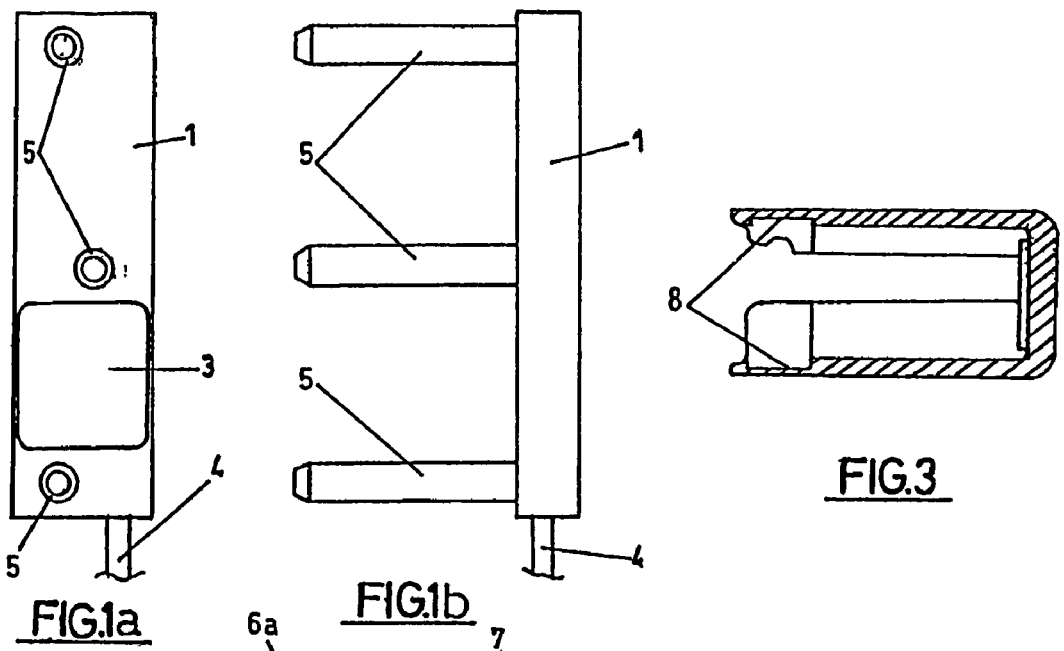
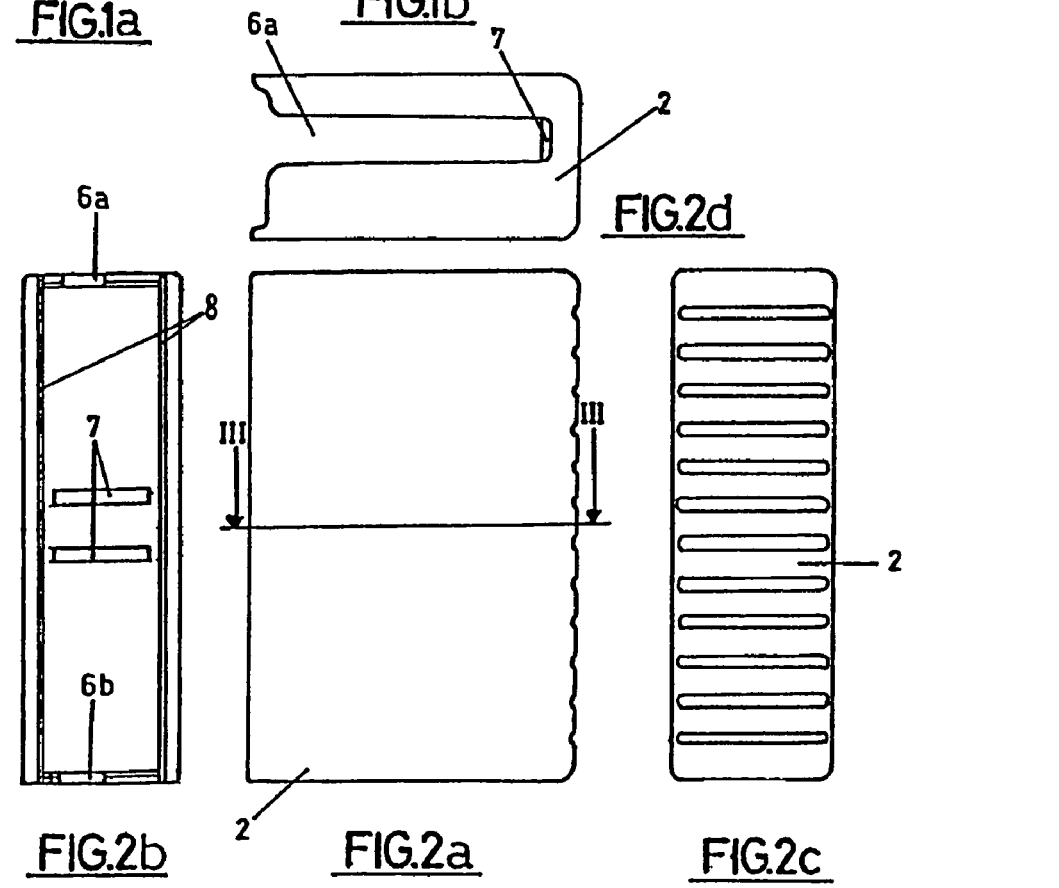

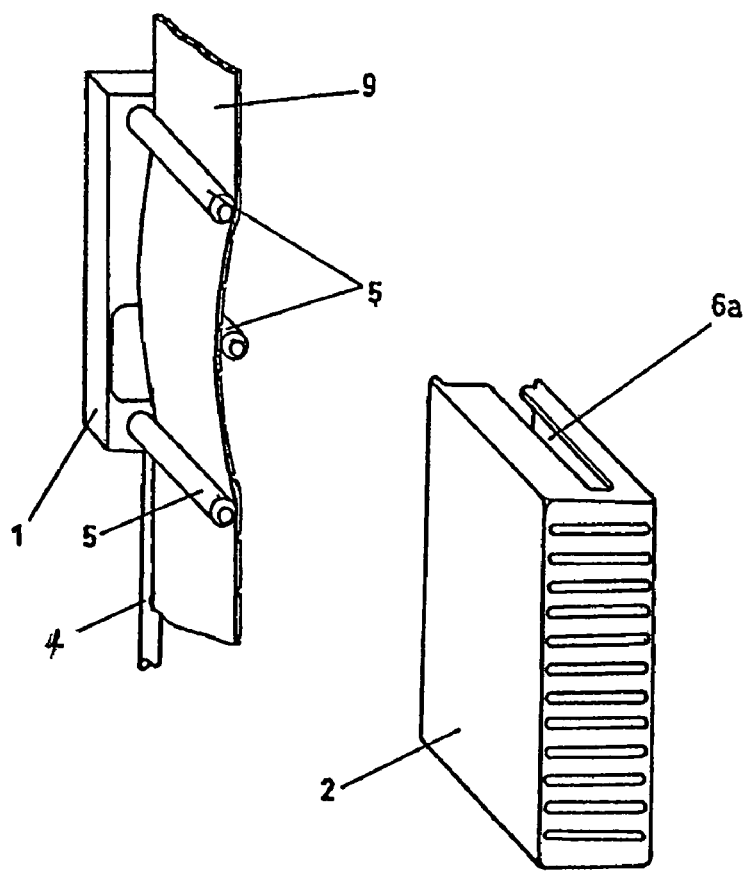
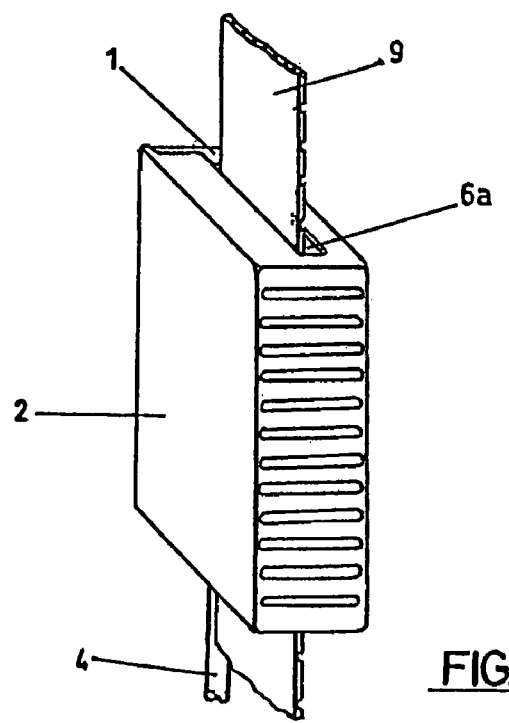

LOAD CELL FOR ELEVATORS AND SIMILAR

REFERENCE TO PRIOR APPLICATIONS

This application is continuation-in-part application of another international application carrying the International Application Number: PCT/ES2004/000515 and the International Filing Date: Nov. 18, 2004. This international application is incorporated herewith as if fully set forth herein.

DESCRIPTION

BACKGROUND OF THE INVENTION

1. Field of the Invention

The present Invention refers to a load cell for elevators and alike, which carries essential characteristics of novelty and remarkable advantages with respect to the known means and utilities for the same end in the actual state of the technology. The field of application of the Invention can be found comprised within the industrial sector dedicated to the application and/or installation of weighing systems, detection and/or evaluation of loads in devices and apparatus subjected to variable or fixed loads.

2. Brief Description of the Background of the Invention Including Prior Art and Conception of the Invention More particular, the Invention proposes the development of a cell of the type of those which are used for the operations of evaluation of the size of a load based on the deformation experienced by the effect of the force to which the cell subjected, and the transmission of this force to the extension meter gages incorporated in predetermined positions of the cell body. The load cell proposed by the Invention has been conceived for its use in the elevators and alike, and corresponds to a master of design especially ideal for its use with elements of suspension planes, configured in the shape of a belt or the like, with a predetermined width.

PRECURSORS AND SUMMARY OF THE INVENTION

The fact is understood by everybody in general that the safe functioning of an elevator, freight lift or the like is unavoidably associated to a limitation of the weight pulled by the cabin. One of the systems usually utilized for the measurement of the load in an elevator is based on the use of load cells, which consists basically of constructed elements for installation in predetermined positions of the elements of suspension and support of those systems, in which it becomes necessary to carry out the measurement of the size of a load at the end. A particular example well known in practice consists in the case of the elevators and freight lifts, which are used for pulling persons or materials, in which the load cells perform to transmit to the control devices a signal derived from the force to which the elevators and freight lifts are subjected, in the fashion such that the control devices determine if the load which should be supported and/or pulled is within pre-established limits. Assuming, the practical example cited above forms only one case of a concrete application, and in no way pretends to limit the field of application, without uniquely serving as an illustration with the view to facilitate the comprehension of the description which will be realized in the following.

According to known constructions in load cells, these load cells incorporate strain gages in predetermined positions, wherein the strain gages experience deformations derived as a result of the force to which the cell is subjected to, which deformations are transformed into an electrical signal where the size of the electrical signal depends for each type of cell on the force to which it is subjected. This electrical signal takes advantage of and is generated conveniently by the associated control means, as had been said above, and serves for determining the size of the force and to recognize therefore if this force is within the limits established for the running of the operation with absolute standards and safety. The recited strain gages are in the habit of being located usually in the interior of the cavities subjected to the effect in the body of the cell, in positions previously calculated according to the distribution of the forces foreseen for the cell, in the kind which can guarantee a correct functioning and precision of the whole assembly set under possible steps.

When one gets about applying this type of load cell to the elevators and freight lifts, the positioning of the cells is related to the cables or the suspension elements of the cabin, the weight of which one desires to control, in such a fashion that the variations in the load experienced by such elements of suspension can be announced directly by the load cells. For this purpose there are known in the actual state of the technology load cells, which are configured in the kind of a metallic solid body of predetermined elastic characteristics, of a rectangular prismatic configuration, wherein in one of its larger faces there is realized a space for the placing and lodging of the extension meter gage charged with transforming the elastic deformation experienced as a consequence of the load into an electrical signal which is supplied to the means of measurement and control, and wherein the cell of the gage is in addition furnished with three elements of the kind of pivots or stubs, perpendicularly projecting from said larger face, joined in pre-determinable longitudinal positions at the part, of which the middle stub is disposed outside the alignment with respect to the two pivots or stubs at the ends, and wherein the suspension cable is made passing between the pivots or stubs, wherein the successive stubs in an alternating position are mounted in the suspension cable, with the effect that these latter stubs are configured with anullar recesses for a safe lodging of said suspension cable. In this way it is guaranteed that the variation in the tension of the cable as a consequence of the variations of the load which it sustains, are transmitted directly to the body of the cell across the mentioned pivots or stubs, and finally to the extension meter gage for the generation of the corresponding electrical signal similarly variable.

The type of load cell described above is of a simple conception and allows a safe, simple and quick manipulation and mounting to be carried out, which load cell is especially indicated for those cases wherein the load is suspended by way of cables. Nevertheless there exists in reality a tendency to the utilization, in a number of installations, of suspension elements, which are not constructed in the shape of cables, but on the contrary are manufactured in the form of planar belts with predetermined width and thickness, constructed based on an flexible material which incorporates in its interior a metallic core formed by various metallic thread lines distributed across the width of the belt in separate positions among themselves. The structural and dimensional characteristics of the belts impede the utilization of the load cells of the type previously described because the load cells not only result in impossibilities for being introduced in the anullar grooves or recesses of the pivots or stubs of the load cell without that normally they include a larger width than the length of the proper stubs, with which the coupling of the planar belts to these latter stubs does not constitute a stable or durable application, without that therefore the utilization of this type of load cell would be possible in an application with planar belts for suspending the load.

Taking the necessity actually existing in the state of the art into consideration, the present Invention has set as a principal object the making of the design and construction of a modified and improved load cell, especially indicated for utilization with elements of planar suspension, of the type of the belts or the like by way of which effective and durable solutions are carried out to the placed problem. This object has been completely achieved by way of a load cell, which will be the object of the description in the following.

BRIEF DESCRIPTION OF THE INVENTION

Essentially, the cell proposed by the Invention consists of two separate and independent elements, however constructed in a shape for mutual coupling, consisting of a cell body properly called and of an external casing. Said cell body consists, in a manner similar to the known cells, within a prismatic rectangular part, which part presents for one of its larger faces a space for the lodging of an extension meter gage adapted to a detection of the deformation experienced by a cell by the effect of the load and the generation of a proportional electrical signal which is sent toward the means for measurement and control through an appropriate cable, and from which major face in the same way projecting three pivot rods extending perpendicularly, located in predetermined positions along the length of the body of the cell and with a non-alignment of the middle pivot rods relative to the outer pivots rods, with the particularity where these pivot rods are lacking any ring-shaped recess as is present in the stubs presently used, and additionally are sufficiently dimensioned for a correct coupling of the suspension belt. The casing has a general prismatic form and is hollow in the interior and is open through one of the larger sides for its coupling to the cell body and furnishes in both opposite smaller sides passage openings of the suspension belt to which the set is coupled. In the opposite wall to the major open side there is foreseen a structure furnished on the internal face with projecting thickenings, which thickenings represent limit stops relative to the lateral edge of the belt which passes through the interior, while in relation to the both larger faces of the prism shows a recess extending over the full height and intended to receive, lodge, and retain with safety the sides of the cell body.

SHORT DESCRIPTION OF THE DRAWINGS

These and other characteristics and advantages of the Invention are more clearly shown by way of the detailed description which follows of a preferred embodiment, given only under the title of an illustrating and not limiting example, with reference to the drawings which are accompanying and in which is shown:

FIG. 1a shows a front elevational view of the cell body constructed according to the Invention;

FIG. 1b shows a side elevational view of the cell body constructed according to the Invention;

FIG. 2a shows a side elevational view of the outer casing;
FIG. 2b shows a front elevational view of the outer casing;
FIG. 2c shows a rear elevational view of the outer casing;
FIG. 2d shows a top planar view of the outer casing;
FIG. 2e shows a bottom planar view of the outer casing;
FIG. 3 shows a transverse section along section line III-III of FIG. 2a;

FIG. 4 is a perspective view of the set of both constituent elements of the load cell of the Invention, and FIG. 5 illustrates the representation of the assembled set of the load cell of the Invention in its operating state.

DESCRIPTION OF A PREFERRED EMBODIMENT

As indicated in the above, the detailed description of the form of the preferred realization of the Invention will be brought at the end in what follows with the aid of the attached drawings, wherein the same reference numerals are utilized across the drawings for designating equal or similar parts. According to what was said, the cell of the Invention is formed by a cell body 1 and a casing 2, from which the cell body is constructed similarly to the cells of the actual state of the technology from a metallic solid prismatic part, wherein in one of the larger faces of the part there is lowered a portion 3 for lodging of the corresponding strain gage adapted to be connected by way of a cable 4 and with the external means of measurement and control of the load in consequence of the size of the electrical signal generated by said strain gage as a consequence of the deformation experienced by the body 1, when it is subjected to variable loads. According to the Invention the body 1 is furnished with three pivot rods 5 having a smooth surface and lacking any groove or necking, solidly attached to the body 1 in predetermined positions, constructed with a metallic material, having pre-established dimensions, and that according to usage they are distributed lengthwise of the body 1 in longitudinal non-aligned positions as can be appreciated in the FIG. 1a.

Attending to the presentations of the FIG. 2 (sub FIGS. 2a through 2e), one can see the representation of a plurality of views relative to the casing provided by the Invention for its coupling to the cell body 1 once the assembly set is placed in an operative condition. Accordingly one notes that the casing 2 has the general prismatic form, hollow in its interior, open by one of the meium lateral faces, closed by the opposite face, and furnished in both bases with openings 6a, 6b in corresponding opposite positions. For the internal face of the closed medium side wall, there is foreseen the formation of two projecting portions 7 extending transversely over the near full-length of the width of said base, while one has foreseen the formation of a recessed zone 8 extending to the total height of said faces by the interior of both larger lateral faces, joined at the front edge of the same. These recessed zones 8 can be appreciated with major details in the view which appears in FIG. 3, corresponding to a section taken along section line III-III of the FIG. 2a, the dimensions of which coincide with laterals of the cell body 1, while said zones 8 are determined to receive, lodge, and retain that said body in the condition where body and casing are mutually coupled.

FIG. 4 shows an exploded view of the assembly set of the load cell of the Invention, wherein both elements of the body 1 and the casing 2 can be appreciated in the condition prior to the coupling, and in which there is shown the suspension belt 9 of the load coupled to the pivot rods 5 of said cell body. As has been said, the figure shows the capability of adaptation of the dimension in all the pivot rods to the size in the width presented by the mentioned belt 9. The condition of complete coupling and therefore of the mounted cell appears in FIG. 5, wherein in FIG. 5 said body 1 is introduced into the interior of the casing 2 and lodged in the recessed lateral zones 8, which have been realized in the interior part of both major side walls of the casing 2. In these conditions, as they are understood, the projecting portions 7 form a limit stop for the interior side edge of the belt 9 impeding larger longitudinal contact with the corresponding wall by avoiding higher forces, which can lead to the separation between the body 1 and the casing 2.

Additional preferred embodiments are presented in the following:

FIG. 1a shows the front elevational view of the cell body (1). The body (1) includes a cuboid part having a cuboid general shape. The longest side of the cuboid can have a length which is 3 to 4 times the size of a middle dimension of the cuboid. The middle dimension of cuboid can be from about 1.5 to 2.5 times the smallest dimension of the cuboid. A lowered portion 3 is furnished in the lower half of the cell body 1 for placing a strain gage. The lowered portion 3 can be disposed between the middle pivot rod 5 and the lowermost pivot rod 5. The lowered portion can be of a substantially rectangular shape with edges spaced apart by 0.9 to 1.0 times the length of the middle edge of the cuboid. A cable 4 running from the strain gage portion 3 to means for measurement and control exits the cuboid through the lower and smallest rectangular face. A largest rectangular face of the cuboid 1 exhibits three perpendicular projecting pivot rods 5 having a smooth surface without blemishes or grooves. An uppermost pivot rod 5 is disposed near an upper edge of the cuboid 1, a lowermost pivot rod 5 is disposed near a lower edge of the cuboid 1, and a middle pivot rod 5 is disposed at the longitudinal center of the cuboid 1. The distance of the upper-level of the uppermost pivot rod 5 from the top of the cuboid 1 is from about 0.2 to 0.6 times the diameter of the pivot rod 5. The distance of the lower level of the lower most pivot rod 5 from the bottom of the cuboid 1 is from about 0.2 to 0.6 times the diameter of pivot rod 5. The uppermost pivot rod 5 and the lowermost pivot rod 5 are disposed equidistant relative to the middle pivot rod 5. The uppermost pivot rod 5, the lower most pivot rod 5, and the middle pivot rod 5 all have the same diameter. The distance of the central axis of the uppermost pivot rod 5 and of the lowermost pivot rod 5 from a first longitudinal edge of the cell body 1 is equal to from about 1.0 to 1.3 times the outer diameter of the pivot rod 5. The distance of the central axis of the middle pivot rod 5 from the first longitudinal edge of the cell body 1 is equal to from about 1.8 to 2.2 times the outer diameter of the pivot rod 5. The length of the pivot rod 5 is from about 5 to 6 times the diameter of the pivot rod 5. The diameter of the pivot rod 5 can be from about 0.6 to 0.7 times the smallest edge of the cuboid. The free end of the pivot rod 5 is frustro conical with a cone angle from 20 to 70 degrees and with a diameter decreasing from the diameter of the pivot rod 5 for a length equal to from about 0.3 to 0.5 times the diameter of the pivot rod 5. The surface of the pivot rod 5 is cylindrical followed by a frustro conical free end. The pivot rod 5 can be attached to the cuboid 1 by way of a screw connection. The pivot rod 5 can be made out of stainless steel. The length of the pivot rod 5 can be from about 0.3 to 0.5 times the length of the longest longitudinal edge of the cuboid forming the cell body 1.

The shape of the casing 2 is generally prismatic. One largest side of the prism is shown in FIG. 2a. The medium-sized sides are shown in FIGS. 2b and 2c. The smallest sides of the prism are shown in FIGS. 2d and 2e. As shown in FIG. 2a largest sides are solid metal without interruption. Two of the largest sides are held together by a full corrugated side as shown in FIG. 2c with horizontally extending corrugations. The inside of the inner face of the medium-sized side with the corrugations carries two projecting portions 7 extending horizontally in the interior of the casing 2 over the full width of the medium-sized side. The projecting portions 7 are disposed near the middle of the medium-sized side and have a distance from the middle equal to from about 0.05 to 0.15 times the length of a longitudinal edge of the casing 2. A recessed lateral zone 8 is shown in FIG. 2b for inserting and clamping the cell body 1 along the longitudinal edges of the medium-size side shown in FIG. 2b. An opening 6a is provided in the top side of the casing 2. The opening 6a has a width of 0.2 to 0.3 times the width of the top side of the casing 2. One edge of the opening 6a coincides with the midline of the top side of the casing 2. Similarly the bottom side of the casing 2 is furnished with an opening 6b having a width of 0.2 to 0.3 times the width of the bottom side of the casing 2. One edge of the opening 6b coincides with the midline of the bottom side of the casing 2. The opening 6a and the opening 6b are disposed vertically aligned. The projecting portions 7 protrude into an imagined hollow cylinder formed by connecting the opening 6a to the opening 6b. The opening 6a is closed on the corrugated side and is open toward the recessed lateral zone 8. The purpose of the openings 6a and 6b is to allow a belt 9 to pass through the casing 2.

The distance of the two recessed lateral zones 8 is essentially equal to the length of the medium sized edge of the cuboid. The depth of the recessed lateral zones 8 is substantially equal to or larger than the length of the smallest edge of the cuboid.

In the following a set of definitions is provided, which are intended to allow more clearly to define the features of this invention.

A load cell for elevators comprises a cuboid shaped solid part having a first largest side, a second largest side disposed opposed to the first largest side, and including a space for incorporating a strain gage, an upper pivot rod 5 solidly attached to the cuboid shaped solid part near an upper end on the first largest side and projecting perpendicularly from the first largest side, wherein the upper pivot rod has a smooth surface, free of recesses or any other groove, and is dimensioned to extend over a total width of a suspending belt 9 passing with a first side by the upper pivot rod; a middle pivot rod 5 solidly attached to the cuboid shaped solid part near a middle on the first largest side and projecting perpendicularly from the first largest side; wherein the middle pivot rod has a smooth surface, free of recesses or any other groove, and is dimensioned to extend over the total width of the suspending belt 9 passing with a second side by the middle pivot rod, a lower pivot rod 5 solidly attached to the cuboid shaped solid part near a lower end on the first largest side and projecting perpendicularly from the first largest side, wherein the lower pivot rod has a smooth surface, free of recesses or any other groove, and is dimensioned to extend over the total width of the belt 9 passing with a first side by the lower pivot rod; wherein an axis of the upper pivot rod when projected vertically into a horizontal plane containing an axis of the middle pivot rod is disposed shifted into a parallel position relative to a position of the axis of the middle pivot rod, wherein the axis of the middle pivot rod when projected vertically into a horizontal plane containing an axis of the lower pivot rod is disposed shifted into a parallel position relative to a position of the axis of the lower pivot rod, and wherein the cuboid shaped solid part, the upper pivot rod, the middle pivot rod, and the lower pivot rod form a solid elastic metallic cell body 1.

A right side wall is formed by a first rectangle having a rear large edge, a front large edge, a top medium edge, and a bottom medium edge. A left side wall is formed by a second rectangle having the rear large edge, the front large edge, the top medium edge, and the bottom medium edge. A rear wall is formed by a third rectangle having a right large edge, a left large edge, a top small edge and a bottom small edge; a top side wall formed by a fourth rectangle having a right medium edge, a left medium edge, a front small edge and a rear small edge. A bottom side wall is formed by a fifth rectangle having a right medium edge, a left medium edge, a front small edge and a rear small edge.

The rear large edge of the right side wall is attached to the right large edge of the rear wall. The rear large edge of the left side wall is attached to the left large edge of the rear wall. The rear small edge of the top side wall is attached to the top small edge of the rear wall. The rear small edge of the bottom side wall is attached to the bottom small edge of the rear wall. The right medium edge of the top side wall is attached to the top medium edge of the right side wall. The left medium edge of the top side wall is attached to the top medium edge of the left side wall. The right medium edge of the bottom side wall is attached to the bottom medium edge of the right side wall. The left medium edge of the bottom side wall is attached to the bottom medium edge of the left side wall. The right side wall, the left side wall, the rear wall, the top side wall, and the bottom side wall form a casing (2). The cell body (1) and the casing (2) form a load cell.

The top side wall has a top slot opening extending parallel to the top right edge. The top slot opening is open on a side of the front small edge of the top side wall. The top slot opening is closed on a side of the rear small edge of the top side wall. The top slot opening (6a) is dimensioned for passing the belt 9.

The bottom side wall has a bottom slot opening extending parallel to the bottom right edge. The bottom slot opening is open on a side of the front small edge of the bottom side wall. The bottom slot opening is closed on a side of the rear small edge of the bottom side wall. The bottom slot opening 6b is dimensioned for passing the belt 9.

A right recessed zone 8 is disposed along the front large edge of the right side wall on an inside of the casing. A left recessed zone 8 is disposed along the front large edge of the left side wall on the inside of the casing. The right recessed zone and the left recessed zone are disposed such as to engage the solid part to form a load cell. The right recessed zone 8 and the left recessed zone are dimensioned in conformance with the first largest side of the cell body 1. Said casing 2 is constructed for coupling with the cell body 1. The casing 2 receives, lodges, and retains the cell body 1 during an operative mounting of a load cell. The load cell is conceived for its utilization with devices of suspended loads supported by the suspending belt. The load cell is constructed to transform variations of the deformation experienced as a consequence of variations of the applied load into electrical signals of an appropriate size for furnishing to an external means for measurement and control.

A protruding projection 7 is disposed transversely on an internal face of the rear wall opposed to an access side. The protruding projection 7 forms a limit stop for a side edge of the suspending belt 9 while the casing 2 and the cell body 1 are mutually coupled. A top recessed zone 8 is disposed along the front small edge of the top side wall on an inside of the casing. A bottom recessed zone 8 is disposed along the front small edge of the bottom side wall on the inside of the casing. A locking element is disposed in front of a member of the group consisting of the right recessed zone 8, the left recessed zone, the top recessed zone, and the bottom recessed zone. The locking element can be a projection of the respective recessed zone. Is not considered necessary to make the contents of this description more extensive in order that an expert in the matter can understand its advance and the advantages derived from the Invention, as well as develop and transfer the object of the Invention into the practice.

Nevertheless it is to be understood that the Invention has been described according to one preferred embodiment of the same, therefore the Invention can be susceptible to modifications without that the embodiment assumes any alteration of the basis of said Invention wherein such modifications can be specially concerning the form, the size and/or the materials of fabrication of the set or of its parts.

The invention claimed is:

1. Load cell for elevators which suspends elements of the load, to transform the variations of the deformation experienced as a consequence of the variations of the applied load into electrical signals of an appropriate size for its furnishing to an external means of measurement and control, a load measuring cell including a solid elastic metallic body, and a space for the incorporation of a strain gage, and wherein said body contains three elements in the form of pivots or stubs solidly attached to the body, perpendicular projecting at the body and disposed in non-aligned longitudinal positions, wherein a suspending belt, to which the cell couples, passes across the said pivots or stubs, passing in a form successively alternating with regard to the mentioned pivots or stubs, being the load cell conceived for its utilization with devices of suspended loads by planar elements, characterized in that:

additionally to the mentioned cell body (1), the load cell comprises a second element consisting of an enclosure casing (2) and constructed for its coupling with the said body;

the pivots or stubs of adaptation to the suspending belt consist of pivot rods (5) with a smooth surface, free of recesses or any other groove, and being dimensioned so that they extend to the total width of the belt (9) to which they adapt themselves; the casing (2) is of a general prismatic form, furnished with openings (6a, 6b) in both a top base and a bottom base, dimensioned for admitting the path of the suspending belt (9), and being the mentioned casing furnished in the internal faces of two larger side walls, in the neighboring zones to the open bases for access, with a zone (8) recessed at each side of said openings, dimensioned to couple with the body (1) of the cell, wherein said casing receives, lodges, and retains the body (1) during the condition of operative mounting of the cell.

2. Load cell according to claim 1, characterized by the formation of protruding projections (7) to dispose transversely by the internal face of the smaller side wall opposed to the access side and which form limit stops for the internal side edge of the suspending belt (9) in the condition of the casing (2) and the body (1) mutually coupled.

3. A load cell for elevators which attach to suspending elements of the load comprising a solid elastic metallic body including a space for incorporating a strain gage, and wherein said body contains three stubs solidly attached to the body, perpendicular projecting at the body and disposed in non-aligned longitudinal positions, wherein the suspending element, to which the body couples, passes across the stubs, passing in a form successively alternating a contacting side with regard to the stubs, wherein the stubs of adaptation to the suspending element consist of pivot rods (5) with a smooth surface, free of recesses or any other groove, and being dimensioned such that they extend to the total width of said suspending element (9) passing through and to which the pivot rods (5) adapt themselves;

a casing (2) having a general prismatic form, open by one of the smaller side faces of the access, furnished with openings (6a, 6b) in both a smaller upper face and a smaller lower face, dimensioned for admitting the path of a suspending element (9), and wherein the casing is furnished with a recessed zone (8) on each internal face of two opposing large side walls, in an area neighboring to an open middle-sized face for access, wherein the recessed zone (8) is dimensioned in agreement with the cell body (1), wherein said casing is constructed for coupling with the cell body (1);

wherein the casing (2) receives, lodges, and retains the cell body (1) during an operative mounting of a load cell;

wherein the load cell is conceived for its utilization with devices of suspended loads by planar elements of the kind of belts or the like;

wherein the load cell is destined to transform variations of the deformation experienced as a consequence of variations of the applied load into electrical signals of an appropriate size for its furnishing to an external means for measurement and control.

4. The load cell according to claim 3, further comprising a protruding projection (7) disposed transversely on an internal face of a medium-sized side wall disposed oppositely to the access side and which forms a limit stop for a side edge of the suspending belt (9) while the casing (2) and the cell body (1) are mutually coupled.

5. A load cell for elevators comprising a cuboid shaped solid part having a first largest side, a second largest side disposed opposed to the first largest side, and including a space for incorporating a strain gage, an upper pivot rod (5) solidly attached to the cuboid shaped solid part near an upper end on the first largest side and projecting perpendicularly from the first largest side, wherein the upper pivot rod has a smooth surface, free of recesses or any other groove, and is dimensioned to extend over a total width of a suspending belt (9) passing with a first side by the upper pivot rod;

a middle pivot rod (5) solidly attached to the cuboid shaped solid part near a middle on the first largest side and projecting perpendicularly from the first largest side;

wherein the middle pivot rod has a smooth surface, free of recesses or any other groove, and is dimensioned to extend over the total width of the suspending belt (9) passing with a second side by the middle pivot rod;

a lower pivot rod (5) solidly attached to the cuboid shaped solid part near a lower end on the first largest side and projecting perpendicularly from the first largest side, wherein the lower pivot rod has a smooth surface, free of recesses or any other groove, and is dimensioned to extend over the total width of the belt (9) passing with a first side by the lower pivot rod;

wherein an axis of the upper pivot rod when projected vertically into a horizontal plane containing an axis of the middle pivot rod is disposed shifted into a parallel position relative to a position of the axis of the middle pivot rod;

wherein the axis of the middle pivot rod when projected vertically into a horizontal plane containing an axis of the lower pivot rod is disposed shifted into a parallel position relative to a position of the axis of the lower pivot rod;

wherein the cuboid shaped solid part, the upper pivot rod, the middle pivot rod, and the lower pivot rod form a solid elastic metallic cell body (1);

a right side wall formed by a first rectangle having a rear large edge, a front large edge, a top medium edge, and a bottom medium edge;

a left side wall formed by a second rectangle having the rear large edge, the front large edge, the top medium edge, and the bottom medium edge;

a rear wall formed by a third rectangle having a right large edge, a left large edge, a top small edge and a bottom small edge;

a top side wall formed by a fourth rectangle having a right medium edge, a left medium edge, a front small edge and a rear small edge;

a bottom side wall formed by a fifth rectangle having a right medium edge, a left medium edge, a front small edge and a rear small edge;

wherein the rear large edge of the right side wall is attached to the right large edge of the rear wall;

wherein the rear large edge of the left side wall is attached to the left large edge of the rear wall;

wherein the rear small edge of the top side wall is attached to the top small edge of the rear wall;

wherein the rear small edge of the bottom side wall is attached to the bottom small edge of the rear wall;

wherein the right medium edge of the top side wall is attached to the top medium edge of the right side wall;

wherein the left medium edge of the top side wall is attached to the top medium edge of the left side wall;

wherein the right medium edge of the bottom side wall is attached to the bottom medium edge of the right side wall;

wherein the left medium edge of the bottom side wall is attached to the bottom medium edge of the left side wall;

wherein the right side wall, the left side wall, the rear wall, the top side wall, and the bottom side wall form a casing (2);

wherein the cell body (1) and the casing (2) form a load cell;

wherein the top side wall has a top slot opening extending parallel to the top right edge, and wherein the top slot opening is open on a side of the front small edge of the top side wall and wherein the top slot opening is closed on a side of the rear small edge of the top side wall, wherein the top slot opening (6a) is dimensioned for passing the belt;

wherein the bottom side wall has a bottom slot opening extending parallel to the bottom right edge, and wherein the bottom slot opening is open on a side of the front small edge of the bottom side wall and wherein the bottom slot opening is closed on a side of the rear small edge of the bottom side wall, wherein the bottom slot opening (6b) is dimensioned for passing the belt;

a right recessed zone (8) disposed along the front large edge of the right side wall on an inside of the casing;

a left recessed zone (8) disposed along the front large edge of the left side wall on the inside of the casing;

wherein the right recessed zone and the left recessed zone are disposed such as to engage the solid part to form a load cell, wherein the right recessed zone (8) and the left recessed zone are dimensioned in conformance with the first largest side of the cell body (1), wherein said casing is constructed for coupling with the cell body (1);

wherein the casing (2) receives, lodges, and retains the cell body (1) during an operative mounting of a load cell;

wherein the load cell is conceived for its utilization with devices of suspended loads supported by the suspending belt;

wherein the load cell is constructed to transform variations of the deformation experienced as a consequence of variations of the applied load into electrical signals of an appropriate size for furnishing to an external means for measurement and control.

6. The load cell according to claim 5, further comprising a protruding projection (7) disposed transversely on an internal face of the rear wall opposed to an access side and which protruding projection (7) forms a limit stop for a side edge of the suspending belt (9) while the casing (2) and the cell body (1) are mutually coupled.

7. The load cell according to claim 5, further comprising a top recessed zone (8) disposed along the front small edge of the top side wall on an inside of the casing;
a bottom recessed zone (8) disposed along the front small edge of the bottom side wall on the inside of the casing.

8. The load cell according to claim 7, further comprising a locking element disposed in front of a member of the group consisting of the right recessed zone (8), the left recessed zone, the top recessed zone, and the bottom recessed zone.

9. The load cell according to claim 8 wherein the locking element is a projection in front of the respective recessed zone.

* * * * *